United States Patent [19]
Dratz et al.

[11] 3,916,063
[45] Oct. 28, 1975

[54] METHOD FOR MANUFACTURING A PRINTABLE, GLUEABLE POLYOLEFIN WEB MATERIAL

[75] Inventors: Richard A. Dratz; Ralph A. Nelson, both of Appleton, Wis.

[73] Assignee: Thilmany Pulp & Paper Company, Kaukauna, Wis.

[22] Filed: Oct. 11, 1973

[21] Appl. No.: 405,451

[52] U.S. Cl. ............... 428/341; 427/322; 427/390; 428/502; 428/505; 428/516; 428/524
[51] Int. Cl.² ............... B44D 1/092; B32B 27/08; B32B 27/32; B32B 33/00
[58] Field of Search ....... 117/47 A, 93.1 CD, 93.31, 117/119.6, 119.8; 427/322, 390; 428/341, 502, 505, 516, 524

[56] References Cited
UNITED STATES PATENTS

| | | |
|---|---|---|
| 2,974,065 | 3/1961 | Mann et al. .................... 117/119.8 |
| 3,111,424 | 11/1963 | LeClair ............................ 117/47 A |
| 3,311,499 | 3/1967 | Busch et al. ..................... 117/119.8 |
| 3,450,557 | 6/1969 | Dratz et al. ........................ 117/76 F |
| 3,629,177 | 12/1971 | Hoffman ..................... 260/29.4 UA |
| 3,730,753 | 5/1973 | Kerr .................................. 117/47 X |

*Primary Examiner*—Michael R. Lusignan
*Attorney, Agent, or Firm*—Fitch, Even, Tabin & Luedeka

[57] ABSTRACT

A method for manufacturing a polyolefin web having a lightweight, adherent, printable, glueable overcoat provided through the application and subsequent drying and curing of an aqueous coating solution of a stabilized amino-formaldehyde polyvinyl alcohol polymer composition and catalyst therefore.

5 Claims, No Drawings

METHOD FOR MANUFACTURING A PRINTABLE, GLUEABLE POLYOLEFIN WEB MATERIAL

The present invention is directed to the provision of printable, glueable polyolefin coated webs, and more particularly is related to the provision of supported or unsupported polyolefin film materials having an adherent, isolubilized coating which renders the polyolefin article ink receptive, glueable, and mar resistant.

While various types of glossy or dense web materials may be printed and glued without difficulty, it is known that polyolefin film surfaces are not generally ink-receptive or glueable. The poor print acceptance and poor ink retention of polyolefin webs has been a problem to the graphic arts and packaging industries for some time, and a considerable amount of effort has been expended toward the solution of this problem, Moreover, it is generally desired for reasons of economical operation to apply the inked indicia through the use of high speed equipment and to employ rapid setting inks. Adhesivity of such inks to a polyolefin film surface is normally deficient and can be readily disrupted by normal abrasive forces encountered during handling or use.

As an indication of this poor adhesivity, such ink films can generally be readily removed from the polyolefin web surfaces by the rapid withdrawal of adhered cellophane-type tape.

Another difficulty often encountered in the printing of polyolefin web materials is that the relatively soft, extensile and delicate polyolefin web surface tends to be marred or injured pursuant to the printing operation. This is particularly true with respect to the stress encountered on high-speed printing equipment.

It is also difficult to glue polyolefin web materials with conventional or labelling type glues such as low cost starch base glues.

Various methods have been developed for the treatment of supported or unsupported polyolefin films in order to enhance the ink receptivity and glueability of the polyolefin film surface. One approach has involved the oxidation of the polyolefin films surface by irradition, corona discharge or heat treatment, but such approaches by themselves have various disadvantages, and moreover, do not substantially improve the mar resistance or the glueability of the polyolefin film, thereby requiring light printing pressures or special glues to achieve the desired results.

It has also been proposed to coat the polyolefin web surface with an adherent, ink receptive coating. The provision, however, of an ink receptive coating which is adherent to a polyolefin film surface, and which has desired characteristics, has presented difficulties and has required particular conditions and apparatus for the coating application.

One successful approach is described in U. S. Pat. No. 3,450,557 to Dratz and Nelson entitled "Polyolefin Coating Composition," which is directed to a coating composition which has been used commercially to produce printable, glueable polyolefin webs that have been well accepted in the barrier label industry. These coatings principally comprise polyvinyl alcohol and polyethieneimine. The specific embodiments of this patent have particularly desirable application to off-machine processes in which polyolefin is extruded onto a paper web and the thus-produced, supported polyolefin web is subsequently coated with the polyvinyl alcohol composition. Processing parameters and conditions of an off-machine type of process provide the capabilities for extending drying time of the applied coating. For some circumstances, it is desirable that the polyvinyl alcohol coating be substantially completely insolubilized, and in this connection, the extended drying times permitted by various off-machine configurations is advantageous.

However, for reasons of economy, it is desirable to insolubilize the coating under conditions which provide relatively short drying periods. It is also advantageous in some circumstances to apply the coating in an on-machine process, such as by application at the post-priming station of a polyolefin film extruder, and to effect drying of the coating in high-velocity drying equipment adjacent the post-priming equipment of the polyolefin film extruder. Drying and insolubilization of polyvinyl alcohol-polyethleneimine compositions by themselves is achieved with difficulty and at some penalty in maximum operating speed under such circumstances. Moreover the elevated temperatures required to dry the coating completely in a short-run equipment configuration also have a tendency to injure or disrupt the polyolefin web surface.

While it is not generally necessary to provide a polyolefin film having a completely insolubilized polyvinyl alcohol coating for use, the ready provision of such an insolubilized coating is desirable. Moreover, the provision of such a coated polyolefin web through the use of demanding, but high-speed, in-line equipment would result in additional areas of use, and application to other markets.

U.S. Pat. No. 3,629,177 discloses water soluble surface finishing compositions comprising an aqueous solution of a stabilized water soluble ureaformaldehyde, vinyl alcohol polymer. These materials are not taught to the suitable for application of polyolefin film surfaces at lightweight application levels. It is a principal object of the present invention to provide an ink receptive and glueable polyolefin film article. It is an additional object of the present invention to provide a method for the production of printable, glueable polyolefin coated webs which is particularly adapted for operation in high-speed equipment having a relatively short drying run. It is another object of the present invention to provide such a method which is suitable for providing polyolefin webs with a printable, glueable, and insolubilized coating consistent with high-speed operation. These and other objects of the invention will become apparent from the following detailed description.

Generally, the present invention is directed to a method for manufacturing a coated, ink receptive, glueable polyolefin web. For purposes of the present invention, the term "polyolefin" is defined as a film forming polymer of one or more straight or branched chain lower aliphatic alkenes, and such materials suitable for provision of polyolefin webs are generally known to those skilled in the art. Specifically included examples of film-forming polyolefins are polyethylene, polypropylene, polyalphabutylene and polyisopropylene.

The polyolefin film may be provided by methods well known to the art, such as sheet extrusion, with or without unilateral or bilateral orientation, and below molding extrusion. The polyolefin film, in addition may be either supported or unsupported. In the former case, the polyolefin film may be extruded or otherwise adhered directly to a substrate material such as paper or metal foil. The polyolefin film may also be a composite film in which the film is provided with multiple layers of different polymer constituents. The film materials may optionally contain one or more additives such as slip agents, antistatic agents, chill roll release agents, and other such additives which are conventionally employed with polyolefin film materials. The surface of the polyolefin film material to which the coating is to be applied may also optionally be subjected to oxidation treatment such as corona discharge treatment if desired. A paper or foil backed polyolefin film may be desirable where the finished polyolefin web is to be used as a packaging material. While the polyolefin film is preferably applied to the paper or foil support material prior to being coated with the ink-receptive and glueable surface, for example by an extrusion process, the paper or foil material may be laminated to the polyolefin subsequent to its coating with the ink-receptive and glueable surface.

Also in accordance with the present invention, the polyolefin film, whether it is supported or unsupported, is uniformly coated with an aqueous solution comprising a stabilized amino-formaldehyde polyvinyl alcohol polymer composition, and an acidic catalyst for the polymer composition. The polyolefin web may be coated on one or both surfaces if unsupported, and if it is provided with a paper, foil or other support material prior to the solution coating step, will generally be coated on only its exposed side.

The aqueous solution is applied to the surface of the polyolefin web to provide a predetermined lightweight coating level, on a solids basis, which will be from about 0.1 to about 1.5 pounds per ream (3,000 square feet), and preferably will be from about 0.3 to about 0.8 pounds per ream of the polyolefin web material, per coated surface of the web.

The aqueous, amino-formaldehyde polyvinyl alcohol, acid catalyst solution employed in the present method will contain between about 5 and about 30 percent total solids, and more preferably will contain between about 10 and about 20 percent by weight total solids, based on the total weight of the aqueous solution.

Suitable stabilized aqueous amino-formaldehyde polyvinyl alcohol compositions of the urea-formaldehyde type are described in U.S. Pat. No. 3,629,177, which is hereby incorporated by reference. Salicylic acid, melamine and/or resorcinol may be substituted for a portion of the urea component of the stabilized polymers described in this patent in the provision of other suitable stabilized amino-aldehyde polyvinyl alcohol polymers.

The acid catalyst employed in the stabilized aminoaldehyde polyvinyl alcohol composition solution may also be generally as set forth in the U.S. Pat. No. 3,629,177. However, depending upon the desired storage or "pot life" stability of the solution with respect to the application requirements, other acid catalysts suitable for curing amino-aldehyde resin materials may also be employed.

The uniform coating of the acid catalyzed polymer solution may be applied by any suitable apparatus and method, such as by Mayer rod, gravure roll, air knife, or any other conventional application method which is suitable for applying a uniform coating. The viscosity of the coating solution should, of course, be compatible with the coating method, and the appropriate viscosity may be provided through various methods, the most expedient of which is control of the degree of dilution of the aminoaldehyde polyvinyl alcohol polymer, and/or control and selection of its intrinsic viscosity such as by molecular weight control.

Following coating of the stabilized amino-aldehyde polyvinyl alcohol solution to the polyolefin film, the water is evaporated from the solution coating and the film and coating are heated to cure and insolubilize the coating material.

It is particularly desirable that the web coated with the aqueous polymer solution may be converted to a cured, adherent insolubilized film which is printable and glueable under short-time, high-speed evaporative heat-treatment conditions. In this connection, the aqueous solution coated web may be passed through a drying zone in which air heated to a temperature between about 300°F. to about 500°F., and preferably from about 380°F. to about 425°F., is impinged upon the web surface. The polymer solution-coated web may be passed through the drying zone at speeds in excess of about 400 feet per minute or more and the drying zone may be relatively short, for example between about 10 and about 20 feet, and preferably about 14–15 feet, consistently with the development of a marresistant, printable, glueable and insolubilized coating which is adherent to the polyolefin film surface.

The following example illustrates various features of the present invention.

EXAMPLE

A coating solution having the following composition is prepared:

| | |
|---|---|
| Aquatronic WR-162E (30 weight percent solids) | 100 pounds |
| FR-5C catalyst (30 weight percent solids) | 12.5 pounds |
| Water | sufficient to provide the coating solution with 10–15 weight percent total solids |

The Aquatronic WR-162E is a stabilized aminoaldehyde polyvinyl alcohol polymer (manufactured by the O'Neal Duro Company of Milwaukee, Wisconsin), and other commercial grades of such Aquatronic products which may be employed include those designated WR-92C and WR-9585. These various grades are believed to be provided with selection of molecular weight, degree of hydrolization of the polyvinyl alcohol, use of humectants and plasticizers such as polyglycols to provide increased flexibility of the resulting coating, and substitution of salicylic acid, melamine and/or resorcinol for a portion of the urea set forth in U.S. Pat. No. 3,629,177. The FR-5C catalyst is believed to be an ammonium nitrate catalyst as set forth in this patent, and may include other ammonium salts of inorganic acids such as ammonium sulfate and ammonium phosphate.

A conventional defoamer may be used in the solution as necessary. Various dyes, pigments and dispersions may also be added to the coating solution to alter slip, opacity, color and surface smoothness properties. For example, the addition of colloidal silica e.g., at about 7 percent solids based on solution weight, provides a pencil-markable surface, and the addition of powdered aluminum, even at much higher solids levels, provides a desirable finished coating.

The coating solution is uniformly applied by Mayer rod at the post priming station of an extruder to the surface of an oxidized or unoxidized polyolefin web in an amount sufficient to provide a finished coat of about 0.6 pounds per 3,000 square feet (less than 1 gram per 10 square feet).

The coated polyolefin web is subsequently passed into an in-line forced air dryer, having a drying length of about 14–15 feet, which impinges high velocity air at 380°–425°F. at the web surface which is moving at speeds in excess of 400 feet per minute. If the coating is dried below about 380°F. dryer air temperature, the Visking reading (measure of surface tension) is about 50–52 dynes, and there is no "duckback" repellent effect when water is placed on the finished coating surface. Although the coating material processed at such dryer temperature appears to be insolubilized, there is a readily discernable color reaction for PVA with iodine and boric acid solution, and surface static effects are minimal. When dried at dryer air temperatures above about 425°F., the Visking reading is about 38–42 dynes, water shows "duckback" repellency, there is a slow or negative test for PVA, and the surface static effects are pronounced. Drying at an air temperature of about 400°F. provides a particularly desirable combination of properties for subsequent printing and glueing operations. In this range, it is believed that the web briefly reaches a final sheet temperature of 220°–230°F. after most of the water has been driven off.

Upon emergence from the dryer and cooling, it is found that the coating is well anchored to the polyolefin surface (whether oxidized, partially oxidized or unoxidized), and shows excellent resistance to removal by the conventional Scotch tape adhesion test. Surface tension measurements are preferably in the 48–50 dyne/cm² range, and the resulting lightweight coating permits application and excellent adhesion of a variety of conventional water based solvent based inks, which also resist removal by the Scotch tape test.

Although certain of the features of the invention have been set forth with particularity in order to accurately describe the invention, alternatives which do not depart from the spirit of the invention are contemplated.

Various of the features of the present invention are set forth in the following claims.

We claim:

1. A method for manufacturing a polyolefin film having an adherent, lightweight, printable, glueable overcoat, comprising the steps of providing a polyolefin film, providing an aqueous coating solution of a stabilized amino-formaldehyde polyvinyl alcohol polymer composition and an acid catalyst for the composition, said coating solution containing between about 5 and about 30 percent by weight total solids, uniformly coating at least one surface of the polyolefin film with said coating solution in an amount to provide a predetermined finished coating level on a solid basis of from about 0.1 to about 1.5 pounds per ream of the polyolefin film per coated surface of the film, and progressively passing the coated film through a heating and drying zone which is a forced air dryer having a drying air temperature of between about 380°F and about 425°F., to dry the water from and cure the solution coating to provide a polyolefin film having an adherent, lightweight, printable and glueable overcoating having a Visking reading of between about 46 and about 52 dynes/cm².

2. A method in accordance with claim 1 wherein said coated film is progressively passed through said heating and drying zone at a lineal speed of about 400 feet per minute or more, wherein the coating solution is applied to one side of the polyolefin film and wherein the finished coating is applied at a level of about 0.3 to about 0.8 pounds per ream, on a dry basis, of the polyolefin film.

3. A method in accordance with claim 2 wherein said coating solution contains between about 10 and about 20 percent by weight total solids.

4. A method in accordance with claim 1 wherein said polyolefin film is subjected to corona treatment prior to coating thereon of said solution.

5. A printable, glueable, overcoated polyolefin film comprising a polyolefin film and an adherent, continuous coating thereon of a cured insolubilized amino-aldehyde polyvinyl alcohol composition having a Visking reading of between about 46 and about 52 dynes/cm², said coating being present at a level of between about 0.1 and about 1.5 pounds per ream per surface of said film.

* * * * *